Sept. 15, 1959    M. E. LAUTNER    2,904,709
ELECTRIC MOTORS
Filed July 11, 1956

INVENTOR,
MAX E. LAUTNER,
BY Terry and Cohn
ATTORNEYS.

2,904,709
Patented Sept. 15, 1959

2,904,709

ELECTRIC MOTORS

Max E. Lautner, Festus, Mo., assignor, by mesne assignments, to Howard Industries, Inc., a corporation of Illinois Application July 11, 1956, Serial No. 597,209

6 Claims. (Cl. 310—90)

My invention relates to improvements in electric motors and more particularly to an improved self-contained rotor assembly which includes shaft bearings and means for providing permanent lubrication for said bearings. The principal objective is to provide a motor which will give optimum performance for many years without requiring service attention of any kind, and consequently which is well adapted to be installed in a concealed, or relatively inaccessible location.

An objective of the invention is achieved in the provision of a rotor having internal bearings, a chamber or reservoir for holding lubricating oil, and improved means for effectively preventing loss of oil from the rotor assembly.

An objective is to enhance the efficiency and power output of small motors of so-called permanently lubricated type by the provision of improved, non-frictional means for inhibiting the escape of the lubricating oil.

The present invention resides in an improved motor having a fixed shaft supported at one end only by the stator frame, and characterized by a rotor having a hollow interior constituting a reservoir for lubricating oil, rotatable shaft bearings fixed within the rotor, a closure cap assembly for sealing the outboard end of rotor and including an improved thrust bearing, and non-frictional means for preventing the escape of oil at the inboard end, where the shaft emerges from the rotor.

These and other objects and advantages will be more fully described and explained in the following description wherein reference is made to the accompanying drawings:

Fig. 1 of the drawings is a front elevational view of a motor constructed in accordance with my invention;

Figure 1:
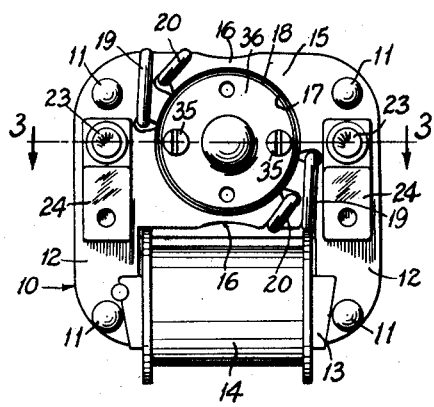
Figure 2:
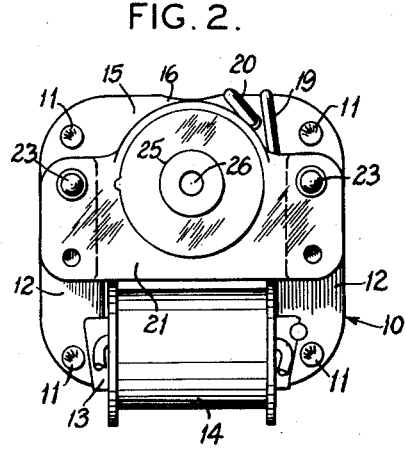
Fig. 2 is a rear elevational view thereof.

The drawings illustrate a small single-phase, shaded-pole type induction motor. In this machine the stator assembly includes a field core 10 composed of stacked laminations secured together by rivets 11. The core 10 provides a closed, four-sided magnetic circuit comprising side leg portions 12 interconnected at their lower ends by the transverse leg 13 upon which is mounted the field winding or coil 14. The upper polar part 15 of the field magnet includes the spaced bridge portions 16 above and below a cylindrical passageway 17 in which is received the rotor 18, to be hereinafter described. Pairs of shading rings 19 and 20 encircle diagonally opposite pole portions of the field magnet in accordance with well known practices in motors of this type.

Extending across the rear of the laminated field core is a transverse plate or stator frame bracket 21 which is formed of non-magnetic material. Bracket 21 has integral spacer blocks 22 at the ends thereof, which blocks seat against the leg portions 12 and receive rivets 23 that fixedly secure frame bracket 21 to the field core 10. The rivets 23 also extend through and secure the blocks 24 of non-magnetic material located on the front face of the stator, the blocks 24 affording supports or mounting facilities, as for apparatus to be connected to or driven by the motor. The frame bracket 21 has cylindrical embossments 25 protruding from the opposite faces thereof in coaxial alignment with the cylindrical passageway 17 in the stator core 10. A shaft 26 is mounted on bracket 21 by having its posterior end portion press-fitted in a hole extending through the embossments 25. The shaft 26 extends centrally through passageway 17 and projects in a cantilever fashion forwardly from bracket 21.

The rotor of the machine shown herein is of squirrel-cage type. The rotor includes the tubular body member 30 to be hereinafter described in detail, which member provides a mounting base or frame for the electro-magnetic part of the rotor. That part may be constructed along conventional lines. In the motor illustrated it comprises an annular core structure 31 made up of a stacked assembly of annular stampings of magnetic sheet metal. Conductor bars or rods 32 extend through the stacked laminations, adjacent the outer periphery thereof, and the ends of the bars 32 are connected to conductor rings 33 at the front and rear ends of the core structure. The said core structure is tightly press-fitted onto the body member 30.

The rotor body member 30 is formed of non-magnetic material, preferably by molding or die-casting. At its forward or outboard end member 30 is provided with an outwardly projecting annular flange 34 having spaced holes which are tapped to receive cap screws 35. A closure cap 36 normally covers and seals the opening at the forward end of the body member and is secured in place by the said cap screws to flange 34. The said flange also affords a mounting base for a gear, air impeller or other device which is to be driven by the motor. Integral corner braces 37 arranged at spaced intervals around the flange serve to reinforce this end of the rotor body. Braces 37 extend from end flange 34 to an annular shoulder 38 abutting the forward conductor ring 33, the longitudinal positioning of the rotor core on the body member 30 being determined by shoulder 38.

Describing now the internal configuration of body member 30 which has heretofore been referred to as tubular, fixedly installed within the passageway or bore of this member is a pair of bearings 39 and 40. These bearings are spaced apart and define between them the chamber 41 for lubricating oil. Chamber 41 surrounds shaft 26 that extends through the said bearings and the chamber is desirably provided with a carrier or reservoir for the lubricating oil in the form of a tubular liner 42 of felt or other material capable of absorbing and holding the oil. It is to be noted that the felt reservoir 42 lies adjacent the outer cylindrical surface of the chamber 41 and is spaced from shaft 26 so as not to impede rotor rotation by frictional contact with the said shaft. The ends of the felt reservoir contact the bearings 39 and 40 which are preferably of the semi-porous variety, formed of sintered alloy, whereby the bearings are adapted to draw oil by absorption from the felt reservoir.

In the present embodiment bearings 39 and 40 are of unequal outer diameter. The relatively smaller rear or inboard bearing 40 is of lesser diameter than that of chamber 41 and is firmly seated in the salient internal hub portion which is provided with four equally spaced longitudinal channels 43 that extend along the outer surface of bearing 40. Channels 43 provide oil ducts connecting a narrow chamber 44 at the rear face of bearing 40 with oil chamber 41. The ducts 43 are desirably formed to have their bottoms disposed at a slight incline with respect to the axis of rotation, thus tending centrifugally to induce oil movement in the ducts away from end chamber 44 and toward chamber 41.

Body member 30 is provided with an inturned annular flange 45 which supports a thin, flexible washer 46 on its outer face, which washer is held in place by a metal washer 47. The washer assembly is secured by staking or displacing the rim portion of the body at spaced points indicated at 53. The flexible washer 46 is formed of rubber-like material of a type which is not adversely effected by oil, such as neoprene, and this element is sized to have its inner margin approach the surface of the shaft. It functions merely as a seal to exclude dust and dirt from the shaft and bearings.

Because the flexible washer 46 excludes dirt and dust from the shaft portion and bearing 40 within the body member 30, there is no wicking action capable of carrying any great quantity of lubricant into chamber 44. When the rotor is idle, a thin film of lubricant may form on the rear face of bearing 40 and on the shaft, but such film will be insufficient to cause any leakage beyond washer 46. When the rotor is rotated, centrifugal force will cause any lubricant film in chamber 44 to move outwardly to the peripheral wall of chamber 44 and through divergent ducts 43 to the felt liner 42.

When the rotor is charged with the correct amount of lubricant, there is no leakage pass washer 46 for the reasons previously discussed. After the rotor is operated for a short period of time, a balanced lubricant condition is attained which prevents such leakage. It is only when the rotor is charged with an over-supply of lubricant that there is any possibility of leakage pass washer 46. However, this condition is automatically relieved and a balanced lubricant condition reached by running the motor. Then, there is no possibility of leakage pass washer 46 either when the rotor is idle or running. Any lubricant collected in rear chamber 44 in the form of film will be returned to the liner 42 between bearings 39 and 40 as previously described.

At the opposite or forward end of the rotor the bearing 39, shown to be of larger diameter than that of the oil chamber 41, is firmly lodged in a bearing seat formed by an enlargement of the body passage. A further annular enlargement at the mouth of the body passage accommodates a resilient O-ring gasket 48. The end cap 36 is adapted to be tightened by the cap screws 35 against the gasket 48, thus to provide sealed junction. End cap 36 is provided with a central outward embossment 49 that forms a cavity at its inner side. The margin of the cavity is formed to receive the edge of a thin disc 50 which extends across the said cavity, spaced from the inner surface of embossment 49. Disc 50, which is preferably formed of sheet material having favorable resilient and bearing properties, such as nylon, is adapted to have its central portion bear against the rounded end of shaft 26. Disc 50 accordingly acts as a resilient thrust bearing that cushions endwise vibrations of the rotor and reduces operating noises.

Figure 3:
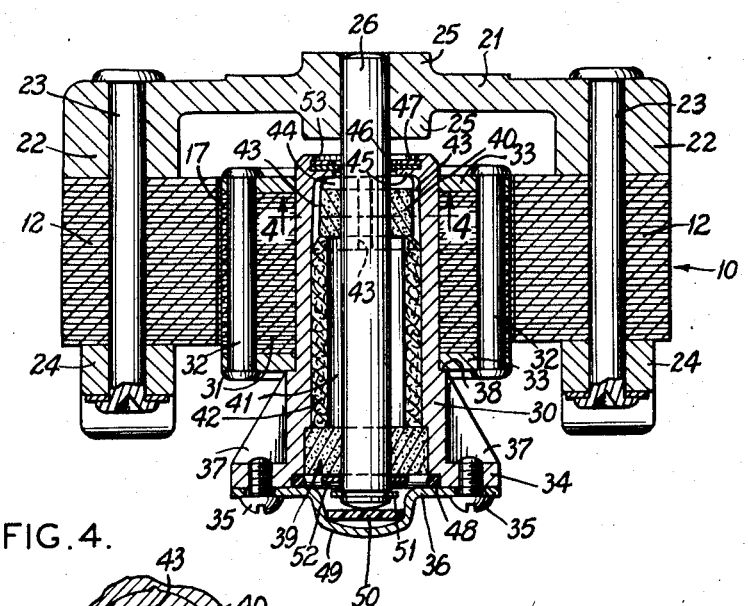
Fig. 3 is a horizontal sectional view taken at line 3—3 of Fig. 1.
Figure 4:
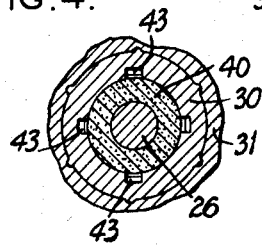
Fig. 4 is a fragmentary sectional view taken at line 4—4 of Fig. 3.

It will appear from Fig. 3 that the magnetic rotor core 31 is offset or displaced a small distance outwardly with reference to the magnetic field core 10. This preferred arrangement of the stator and rotor core structure causes the stator field to apply a small component of force on the rotor that tends to draw it axially inwardly, maintaining bearing disc 50 in slight pressure contact with the end of shaft 26 when the motor is operating. As a consequence axial movements of the rotor induced by fluctuations in line voltage or any other cause are countered by the cushioning effect of the resilient bearing disc 50. The rotor is retained on the shaft by the spring clip 51 seated in an annular shaft groove and a washer 52 is carried on the shaft between the clip 51 and the outer bearing 39.

From the foregoing description it will be understood that bearing lubricant is carried in an oil chamber formed within the rotor between the bearings. Rotation of the reservoir and bearings acts centrifugally to prevent oil from accumulating on the shaft. Since the shaft does not turn there is no "pumping" action that tends to displace the oil axially away from the bearings. Any surplus oil which may collect in the lower half of the reservoir and in the antechamber 44 when the rotor is stationary becomes quickly disbursed in the absorbent liner 42 when the motor is energized. Oil which has reached the antechamber 44 is returned to the main reservoir through the ducts 43. The described motor design and construction achieves the objects and advantages of oil conservation, long life, and quiet, vibration-free operation.

The description and drawings hereof are given only by way of illustration and example. Modifications of form and arrangement of the motor parts may be made without departing from the spirit and intendment of the invention which is defined by the appended claims.

I claim:

1. In an electric motor, a stator, a rotor having an axial bore, a stationary shaft secured at one end only to the stator assembly and extending into said bore, shaft bearings fixed to the rotor within said bore, oil-retaining means in said bore between and in contact with the inner faces of said bearings, and means within said rotor bore forming an oil duct for conducting oil from the outer face of one of said bearings to said oil-retaining means within the bore.

2. In an electric motor including a stator and a rotor having an axial passageway, a fixed shaft secured at its rear end to the stator and extending axially into said passageway, a detachable cap providing a closure for the front end of said passageway, shaft bearings fixed to the rotor within and adjacent to the front and rear ends of said passageway, oil-retaining means surrounding said shaft, said means being disposed between and in contact with said bearings, and a resilient bearing disc carried by said cap and rotatable therewith, the resilient disk abutting the front end of said shaft, the rotor being offset forwardly relative to said stator so that said disc is urged against the end of the shaft upon actuation of the rotor.

3. In an electric motor, a rotor having an axial passage, a cap providing a closure at the forward end of said passage, a stator including a fixed shaft extending into said rotor passage from the rear end thereof, front and rear shaft bearings fixed to the rotor within said passage, said bearings defining an oil chamber therebetween, said rotor having an annular flange defining an antechamber for oil within said passage rearwardly of said rear bearing, and means forming an oil duct along the rear bearing within the rotor passage interconnecting said chamber and antechamber.

4. An electric motor including a rotor having an axial passageway and a stator having a fixed shaft extending into said passageway, front and rear bearings fixed to the rotor within said passageway, oil-retaining means carried by the rotor in said passageway between and in contact with said bearings, a cap providing an oil-tight closure at the front end of said passageway, an inwardly projecting annular flange on said rotor, said flange being spaced from and defining an antechamber rearwardly of said rear bearing, and means forming a duct within the rotor passage for conducting oil from said antechamber to said oil-retaining means, the duct being forwardly divergent relative to the rotational axis of the rotor.

5. In an electric motor including a rotor including a tubular body member having an axial passage, a cap covering and providing a sealed closure for the forward end of said passage, an annular, inwardly directed flange at the rear end of said passage, a stator assembly including a fixed shaft extending forwardly in said passage, front and rear porous metal bearings fixedly mounted to said body member in spaced relation within said passage, said bearings providing a chamber between them for holding a supply of lubricating oil, a tubular oil retaining member in said chamber in endwise abutment with said bearings and spaced radially outwardly from the shaft, and a plurality of longitudinally extending grooves formed in the body member adjacent the outer circumferential surface of said rear bearing, said grooves providing ducts for returning oil from the rear end face of the rear bearing to said chamber, the body member, oil-retaining means and bearings rotating as a unit about said stationary shaft so that centrifugal force urges the oil outwardly against said body member to said ducts.

6. In an electric motor, a rotor including a tubular body portion having an external annular mounting flange at its forward end and an internal annular dust-excluding flange at its rear end, a removable end cap assembly including a sealing element providing an oil-tight closure for the forward end of said body portion, front and rear bearings fixedly mounted in said body portion, a tubular oil-retaining element lining the inner surface of said body portion between and in end contact with said bearings, said body portion having a plurality of longitudinal oil duct grooves extending adjacent the outer circumferential surface of said rear bearing from the front to the rear end faces thereof, the body portion, oil-retaining element and bearings rotating as a unit so that centrifugal force urges the oil outwardly from the rear of the rear bearing to the body portion and duct grooves, the oil duct grooves being divergently related forwardly relative to the axes of rotation of the rotor to urge the oil forwardly to the tubular oil-retaining element upon rotation of the rotor; a stator assembly including a fixed shaft, said shaft extending into said rotor body portion from the rear end thereof, through said bearings and into end abutting contact with a part of said end cap assembly.

References Cited in the file of this patent

UNITED STATES PATENTS

| | | |
|---|---|---|
| 618,131 | Parker et al. | Jan. 24, 1899 |
| 1,563,945 | Apple | Dec. 1, 1925 |
| 1,853,160 | Apple | Apr. 12, 1932 |
| 1,919,522 | Lipman | July 25, 1933 |
| 2,067,155 | Levy et al. | Jan. 5, 1937 |
| 2,193,713 | Cole | Mar. 12, 1940 |
| 2,685,658 | Feiertag | Aug. 3, 1954 |

FOREIGN PATENTS

| | | |
|---|---|---|
| 908,508 | Germany | Apr. 5, 1954 |